Patented Dec. 9, 1941

UNITED STATES PATENT OFFICE 2,265,356

MANUFACTURE OF NEW ORGANIC COMPOUNDS

John Stanley Herbert Davies, Blackley, Manchester, England, assignor to Imperial Chemical Industries Limited, a corporation of Great Britain No Drawing. Application July 26, 1939, Serial No. 286,583. In Great Britain July 29, 1938

11 Claims. (Cl. 260—319)

This invention relates to new organic compounds, and to a process for their manufacture. More particularly, this invention deals with the preparation of novel $\beta$-isoindigo derivatives, which may be named generically 1,1'-amino derivatives of 3,3'-bis-isoindolenylidene, and which may be represented generically by the formula

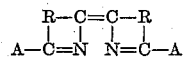

In this formula, R, R are phenylene radicals to which the C, C atoms of the heterocyclic rings are attached in adjacent positions, while A, A represent amino radicals of the general formula NHR₁, wherein R₁ stands for an aryl radical.

It is an object of this invention to provide new organic compounds having, variously, utility in the arts of dyeing textiles or as intermediates for the synthesis of dyestuffs. It is a further object of this invention to provide processes for obtaining such compounds. Other and further important objects of this invention will appear as the description proceeds.

The manner in which we accomplish the aforegoing objects will now be apparent from the following description.

In copending application, Serial Number 272,056, filed May 5, 1939, by Drew and Kelly, and in the corresponding British Patent No. 216,342 and French Patent No. 853,624, a novel organic compound is described which is obtained by treating phthalonitrile with for example hydrogen sulfide and ammonia. From its reactions, this new compound appears to be tautomeric, the tautomeric, the tautomeric forms being represented by the two general formulae I and II below

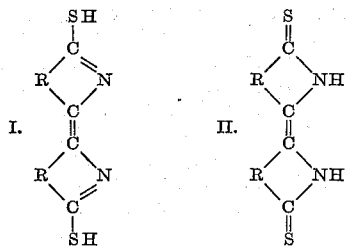

wherein R, R stands for phenylene radicals, in which the two C atoms of the heterocyclic ring are attached in adjacent positions. Because the above compounds may be looked upon as derived from two isoindolenine radicals,

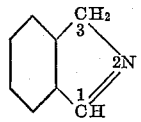

joined together by a double bond in the 3-positions, the inventors in said copending application named the said compounds as 1:1'-dimercapto-3:3'-bis-isoindolenylidenes. This nomenclature will be adhered to in the following discussion.

We have now found that valuable new colored compounds may be obtained by treating the dialkyl thio-ethers of the above mentioned compound with primary aromatic amines. The said dialkyl thio-ethers are 1:1'-di-(alkylmercapto)-3:3'-bis-isoindolenylidenes.

The action of the arylamines appears to be that of replacing either one or both of the alkylmercapto substituents with arylamino groups.

We have also found that the new compounds which are obtained from the arylamines can be converted to further new compounds, which are water-soluble, by sulphonation.

The process of the first part of the invention may be conveniently effected by heating the reactants together in the presence of a tertiary aromatic amine or an excess of the aromatic amine, or other suitable liquid solvent or diluent. Generally the process takes place readily and the yields are good. The products may be used as pigment colouring matters, or when they carry suitable substituents, as lake-making intermediates or as dyestuffs for wool or acetate artificial silk.

The process of the second part of the invention can be conveniently effected by stirring with a sulphonating acid, e. g. concentrated sulphuric acid or oleum, if necessary with heating. The sulphonated products may be used in lake-making or in dyeing animal fibres.

The products of both processes of the invention are also useful as intermediates for the manufacture of dyestuffs and colouring matters.

The 1:1'- di(alkylmercapto)- 3 : 3'-bis-isoindolenylidenes which are used as starting materials in this invention may be made by treating the above new compound of said British Patent No. 516,342 with alkylating agents. The preferred compounds are the dimethyl and diethyl derivatives, since these are the most readily obtainable.

The following examples, in which parts are by weight, illustrate but do not limit the invention.

*Example O.*—(Preparation of the initial material; compare Example 1 of British Patent No. 516,342). 20 parts of phthalonitrile are dissolved in 160 parts of warm alcohol and 18 parts of aqueous ammonia (s. g. 0.88) added. The mixture is cooled and hydrogen sulphide passed in. When the coloured plate-like crystals appear, the mixture is warmed and the passage of hydrogen sulphide continued until excess is present. The mixture is then boiled until no more ammonia or hydrogen sulphide is evolved, filtered, washed, dried and extracted with carbon disulphide to remove free sulphur. The small quantity of impurity then present can be extracted with hot nitrobenzene. The yield is almost quantitative. The product consists of purple-black crystals of 1:1'-dimercapto-3:3'-bis-iso-indolenylidene. It dissolves in hot pyridine with an intense red colour and is slightly soluble in aqueous ammonia and in aqueous sodium carbonate.

Example 1

A mixture of 5 parts of 1:1'-di-(methylmercapto)-3:3'-bis-isoindolenylidene (obtained by treating the product of Example O above with dimethyl sulphate and alkali) and 25 parts of aniline is boiled for 1 hour, cooled and filtered. The resulting filter-paste is washed with benzene and dried.

The product is brown and crystalline and appears to be substantially pure.

The pure compound which is readily obtained by recrystallising from aniline is brown in colour; it does not melt below 300° C. Its ultimate analysis corresponds to the empirical formula $C_{28}H_{20}N_4$ and the compound is believed to have the constitution represented by the following formula

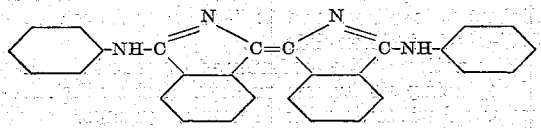

i. e. 1:1'-dianilino-3:3'-bis-isoindolenylidene.

The corresponding dimethyl derivative which has similar properties may be made in a similar way from p-toluidine.

Example 2

A mixture of 5 parts of 1:1'-di-(methylmercapto)-3:3'-bis-isoindolenylidine and 25 parts of p-chloroaniline is boiled for 2 hours, cooled and filtered. The filter-paste is washed with benzene and the product then recrystallised from dimethylaniline.

The product is in the form of red crystals, with a dark green reflex. It does not melt below 310° C. It is believed to be the dichloro derivative of the product of Example 1, i. e. 1:1'-di-(p-chloroanilino)-3:3'-bis-isoindolenylidene.

Example 3

This is the same as Example 2 except that o-chloroaniline is used instead of p-chloroaniline. A similar product is obtained and this melts at 268–270° C.

Example 4

A mixture of 30 parts of 1:1'-di-(methylmercapto)-3:3'-bis-isoindolenylidene and 15 parts of p-phenetidine is heated to 160° C. for 1 hour, cooled and filtered. The filter paste is washed with benzene and then recrystallised from p-phenetidine.

The product melts at 294° C. and forms lustrous bronze red needles.

Example 5

A mixture of 3.2 parts of 1:1'-di-(methylmercapto)-3:3'-bis-isoindolenylidene, 4.3 parts of p-phenylenediamine and 22.5 parts of dimethylaniline is boiled for 1 hour, cooled and filtered. The filter-paste is washed with benzene and then extracted with hot benzene to remove some residual p-phenylenediamine. The extracted product is a reddish-brown powder. It is crystallised from dimethylaniline. It does not melt below 300° C.

It appears to correspond in constitution to the product of Example 1, but contains two additional substituents, viz. two amino groups.

Example 6

A mixture of 3.2 parts of 1:1'-di-(methylmercapto)3:3'-bis-isoindolenylidene, 5.5 parts of anthranilic acid and 22.5 parts of dimethylaniline is heated at 110–120° C. for 1½ hours, cooled and filtered. The filter-paste is washed with benzene and dried. It dissolves in hot dilute aqueous sodium carbonate with an orange red colour. On cooling the solution deep-red flat needles of the sodium salt separate.

The sodium salt may be used for lake making purposes and also as a dye for acetate artificial silk, which it colours in orange shades.

Example 7

This is the same as Example 6, except that m-aminobenzoic acid is used instead of anthranilic acid.

The product is brown in colour and dissolves in boiling 10% aqueous sodium carbonate to give an orange solution. On cooling, the sodium salt is deposited as small brown crystals.

The free acid corresponds to the empirical formula $C_{30}H_{20}O_4N_4$ and is believed to be di-m-carboxyphenylamino-bis-isoindolenylidene.

The product of this example, like that of Example 9, is suitable for lake making purposes. It dyes acetate artificial silk in yellow shades of good fastness to washing.

Example 8

This is also the same as Example 6, except that p-aminobenzoic acid is used instead of anthranilic acid.

The product forms reddish-brown crystals. It dissolves in hot 5% aqueous sodium carbonate and on cooling, the sodium salt separates as brown crystals with a greenish sheen.

In properties it is similar to the product of Example 7.

Example 9

75 parts of the product of Example 1 are stirred into 276 parts of 100% sulphuric acid during a quarter of an hour while the temperature is kept at 20° C. Heating is continued at this temperature for 1 hour. The mixture is poured into 1700 parts of water and 300 parts of anhydrous sodium carbonate added. The mixture is filtered and the filter-paste dried.

The product is a yellowish-brown crystalline solid which dissolves in water to give an orange solution. It is crystallised from a mixture of ethyl alcohol and water when it forms red needles. The ultimate analyses correspond to the empirical formula $C_{28}H_{18}O_6N_4S_2Na_24H_2O$. It is believed to be the disodium disulphonate of the product of Example 1, containing about 4 molecules of water of crystallisation. It dyes wool in yellowish-orange shades from an acid bath.

Example 10

75 parts of the product of Example 4 are stirred into 276 parts of 100% sulphuric acid in ½ hour at 20–30° C. Heating is continued at 30° C. for 1 hour. The mixture is poured into water and the product isolated in a similar manner to that of Example 9.

The resulting product, which is the sodium salt, is orange in colour and is soluble in water with a reddish orange colour. It is believed to be the disodium disulphonate of the product of Example 4 containing water of crystallisation. It dies wool in reddish-orange shades from an acid bath.

Example 11

The product of Example 3 is sulphonated in a similar way to that described in Example 9.

The resulting product dyes wool from an acid bath in yellow-orange shades.

Example 12

A mixture of 14.8 parts of di-p-aminophenyl ether, 6.4 parts of 1:1'-di-(ethylmercapto)-3:3'-bis-isoindolenylidene (made in a similar way to the corresponding methyl compound but using diethyl sulphate instead of dimethyl) and about 20 parts of dimethylaniline is boiled for 2 hours, allowed to cool, the solid filtered and washed with petrol thioether. The residue is a light brown solid. Instead of the thioether used as starting material there may be used the corresponding diethyl or dipropyl thioethers.

Example 13

The product of Example 12 is readily sulphonated at 15-20° C. with 90% sulphuric acid and gives a brown sulphonic acid, which is suitable for making lakes and which dyes wool and silk in brown shades.

Example 14

A mixture of 9.6 parts of 1:1'-di-(methylmercapto)3:3'-bis-isoindolenylidene, 16.8 parts of 2-amino-3-naphthoic acid and about 50 parts of dimethylaniline is boiled for 1 hour, allowed to cool, filtered and the residue washed with petrol ether. It is then ground and boiled with acetone and with ethyl alcohol and filtered. The product is a bluish-red solid which is only sparingly soluble in alkalies.

Example 15

The product of Example 14 is sulphonated by stirring with about 10 times its weight of 20% oleum at 15-20° C.

The sulphonated product dyes wool in yellowish-scarlet shades.

I claim:

1. A 3,3'-bis-isoindolenylidene substituted in the 1,1'-positions by arylamino radicals.
2. 1,1'-diarylamino-3,3'-bis-isoindolenylidene.
3. 1,1'-di(sulfo-anilino)-3,3'-bis-isoindolenylidene.
4. 1,1'- di -(3''- carboxy- 2''- naphthylamino)-3:3'-bis-isoindolenylidene.
5. The process of producing organic compounds, which comprises reacting a 1:1'-dialkyl mercapto-3:3'-bis-iso-indolenylidene with primary aromatic amines.
6. A process as in claim 5, wherein the primary aromatic amine employed is a mononuclear primary aromatic amine.
7. A process as in claim 5, wherein the primary aromatic amine employed is a chloroaniline.
8. A process as in claim 5, wherein the primary aromatic amine employed is 2-amino-3-naphthoic acid.
9. A process of producing organic compounds which comprises reacting a 1:1'-dialkyl-mercapto-3:3'-bis-iso-indolenylidene with a primary aromatic amine, and then sulfonating the resulting 1:1'-diarylamino-3:3'-bis-isoindolenylidene.
10. 1,1'- di -(chloro-anilino)- 3:3' -bis-isoindolenylidene.
11. A process for producing an organic compound, which comprises reacting a 1:1'-dialkylmercapto-3:3'-bis-isoindolenylidene with aniline, and then sulfonating the resulting 1:1'-dianilino-3:3'-bis-isoindolenylidene.

JOHN STANLEY HERBERT DAVIES.

CERTIFICATE OF CORRECTION.

Patent No. 2,265,356.  December 9, 1941.

JOHN STANLEY HERBERT DAVIES.

It is hereby certified that error appears in the printed specification of the above numbered patent requiring correction as follows: Page 1, first column, line 29, for the patent number "216,342" read --516,342--; lines 34 and 35, strike out "tautomeric, the"; and second column, line 51, for "When the" read --When dark--; page 3, first column, line 15, for "thioether" read --ether--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.